United States Patent [19]

Brorein

[11] 4,154,976
[45] May 15, 1979

[54] FLAME RETARDANT INSIDE WIRING CABLE MADE WITH AN ANNEALED METAL SHEATH

[75] Inventor: William J. Brorein, Whippany, N.J.

[73] Assignee: General Cable Corporation, Greenwich, Conn.

[21] Appl. No.: 845,874

[22] Filed: Oct. 25, 1977

[51] Int. Cl.² .......................... H01B 7/20; H01B 7/34
[52] U.S. Cl. .................... 174/115; 174/102 R; 174/121 A
[58] Field of Search ............. 174/121 A, 102 R, 107, 174/122 R, 122 G, 113 A

[56] References Cited

U.S. PATENT DOCUMENTS

| 2,141,910 | 12/1938 | Hayman ......................... 174/102 R |
| 2,697,772 | 12/1954 | Kinghorn ....................... 174/102 R |
| 2,795,640 | 6/1957 | Crandall ........................ 174/122 R |
| 2,803,730 | 8/1957 | Kinghorn ....................... 174/102 R |
| 3,291,891 | 12/1966 | Sharp ............................ 174/107 |
| 3,303,270 | 2/1967 | Shelton .......................... 174/122 |
| 3,356,790 | 12/1967 | Pollizzano et al. ............ 174/102 R |
| 3,529,340 | 9/1970 | Pollizzano et al. ............ 174/102 R |
| 3,558,801 | 1/1971 | Eilhardt ......................... 174/102 R |
| 3,928,210 | 12/1975 | Peterson ........................ 174/121 A |
| 3,941,908 | 3/1976 | Valia et al. .................... 174/121 A |
| 4,064,359 | 12/1977 | Peterson et al. ............... 174/121 A |

Primary Examiner—Bruce A. Reynolds
Assistant Examiner—E. F. Borchelt

[57] ABSTRACT

This inside wiring cable has insulated conductors surrounded by one or more layers of heat-resistant tape covered by a protective metal sheath which is preferably made of longitudinally folded metal strip with the seam welded and the tube metal then reduced in diameter down into intimate contact with the core and annealed. The cable is fire-resistant so that it does not spread fire. The metal sheath prevents any "afterburn."

14 Claims, 3 Drawing Figures

U.S. Patent  May 15, 1979  4,154,976
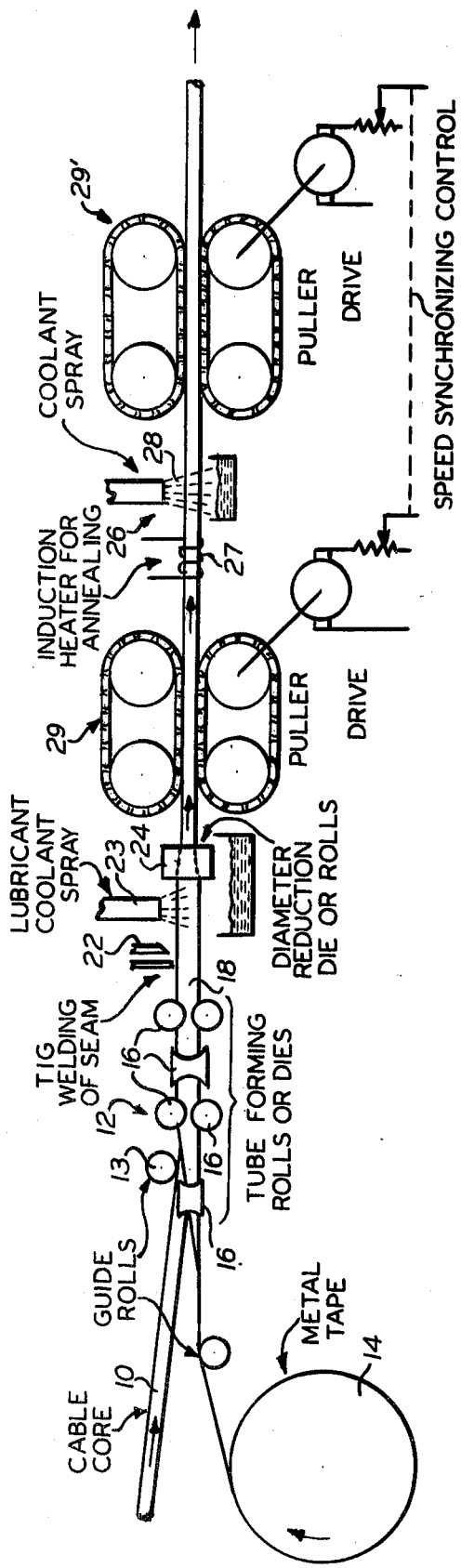
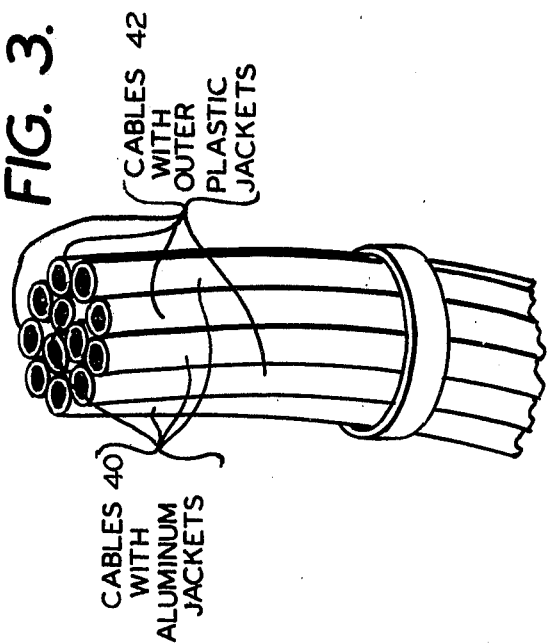
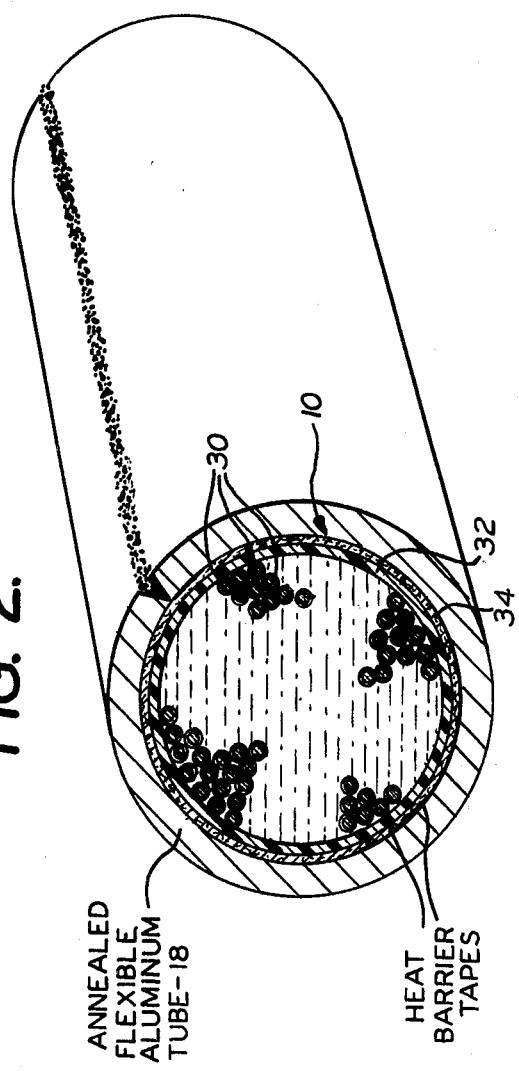

FLAME RETARDANT INSIDE WIRING CABLE MADE WITH AN ANNEALED METAL SHEATH

PRIOR ART

United States patents that seem pertinent to part of this invention are as follows: U.S. Pat. Nos. 3,529,340; 3,567,846; and 3,693,250.

BACKGROUND AND SUMMARY OF THE INVENTION

The object of this invention is to make a more flameretardant flexible cable for use inside buildings for interconnecting telephone and other low voltage communication or signal circuits.

Basically to accomplish this objective, the usual PVC plastic jacket over the cable core has been replaced with an annealed flexible aluminum or copper tube that is made from a longitudinal strip that is formed into a tube over the core, continuously welded, drawn down snugly onto the core and annealed in a continuous operation.

The cable core, consisting of a number of insulated single or paired conductors, is wrapped with heat barrier tapes to protect the core during manufacture and subsequent use in the field. These tapes may consist of one or more layers of asbestos, paper, fiberglass, foamed plastic or the like; however, paper tapes either helically or longitudinally applied are the most economical at this time.

The conductor insulation is a specially formulated semi-rigid PVC that is self-extinguishing and it emits minimum smoke fumes when exposed to fire due to the use of relatively large amounts of inorganic materials in its composition.

Some of the advantages of this invention over conventional polyvinyl chloride plastic jacketed cables are that the non-combustible metal sheath of the invention replaces a plastic jacket which comprises more than half of the combustible material weight in the conventional cable. For example, a popular size of conventional cable containing 24 pairs of No. 24 AWG wire contains 27 lbs of PVC jacket material per thousand feet and 24 lbs of PVC conductor insulation. Also, the noncombustible metal sheath greatly reduces flame spread in the event of a fire and also prevents afterburn in the cable of the present invention.

Elaborate tests prescribed by the Underwriters Laboratories* showed that aluminum sheathed cables of this invention had negligible flame travel or spread beyond the point of direct flame application, while all comparable plastic sheathed cables had flame spread the entire length of the cable in vertical flame tests and for 10 to 15 feet in horizontal flame tests.

* U.L. 1277; ASTM-E 84 (modified for cable)

It was also discovered that the intermixing of aluminum sheath cables among plastic sheath cables, which might be cables already installed, had the effect of reducing flame spread among all of the cables, as was demonstrated by tests.

A still further advantage is that the lightweight flexible annealed aluminum sheath cables are easy to install and such an installation is far more economical than placing plastic sheath cables in metal conduits.

Other objects, features and advantages of the invention will appear or be pointed out as the description proceeds.

BRIEF DESCRIPTION OF DRAWINGS

In the drawing, forming a part hereof, in which like reference characters indicate corresponding parts in all the views:

FIG. 1 is a diagrammatic showing of apparatus for applying the metal sheath to the cable core in accordance with this invention;

FIG. 2 is a sectional view of a flame-retardant inside wiring cable made in accordance with this invention; and FIG. 3 is a diagrammatic showing of an intermixture of cables having outer plastic jackets and aluminum sheaths.

DESCRIPTION OF PREFERRED EMBODIMENT

FIG. 1 is a diagrammatic showing of one way in which the metal sheath inside wiring cable of this invention can be made. A cable core 10 is conveyed to a cladding station 12 by rollers 13. Metal tape is withdrawn from a roll 14 of such tape and is advanced through forming rolls 16 to the cladding station 12 where it is longitudinally folded around the cable core with the inside diameter of the tubular sheath somewhat larger than the outside diameter of the cable core 10. The sheath, as it comes from the cladding station 12, is indicated by the reference character 18 in FIG. 1.

The manufacture of the cable core 10 may be by conventional means, and the construction of the core will be described in connection with FIG. 2.

The edges of the metal sheath are held in abutting relation by guide rollers 16 or forming dies with the longitudinal abutting edges of the metal in contact with one another as they pass through a welding station 22 which welds the abutting edges of the seam together. Welding by the tungsten insert gas (TIG) process is typical.

The larger diameter of the sheath 18 provides spacing of the seam from the core, which protects the core from damage by the welding heat; and the heat in the seam is dissipated rapidly by a lubricant spray 23 and by conduction into the cooler portions of the sheath 18. The sheath 18 then passes through a reducing die 24 or rolls which reduces the diameter of the sheath so that its inside diameter is substantially equal to the outside diameter of the core 18, and the metal provides a continuous protective jacket around the core.

Beyond the reducing die 24, the sheathed cable passes through an annealing zone 26 which supplies sufficient heat, by induction coil 27, to anneal the metal, followed by cooling sprays 28 to quickly quench the metal of the sheath. The cable is advanced through the successive operating stations by one or more pullers, which are shown diagrammatically in FIG. 1 and indicated by the reference characters 29 and 29'.

FIG. 2 shows the cable core 10 formed with a plurality of conductors 30, each of which is surrounded by a layer of insulation, preferably a semi-rigid polyvinyl chloride insulation. The insulation on the conductors 30 preferably contains some 5 to 40 parts of inorganic filler material including antimony trioxide. A typical formulation would be:

PVC resin: 100 parts
Plasticizer: 20 to 40 parts
Filler: 5 to 40 parts
Stabilizers & Lubricants: 1 to 10 parts One or more layers of heat-resistant materials is applied over the conductors 30 to complete the construction of the cable core 10. FIG. 2 shows two such layers, including an inner layer 32 and an outer layer 34. These layers are preferably tapes applied either helically or longitudinally and they can be made of heat-resistant material such as asbestos, paper, fiberglass, or foamed plastic. Where more than one layer is used, they can be made of different kinds of material from one another. Ordinary craft paper is quite suitable, but crepe paper can be used for greater heat insulation of the core. Foam plastic tapes, rubber tapes, rubber polyester laminated tapes, or silicone rubber are desirable where high dielectric strength is needed between the sheath and the cable core. Intumescent tapes, such as made by Avco Systems and others are useful for delaying damage to the core and to prolong the cable integrity when exposed to flame.

For minimum fuel contribution, where the cable may be melted and entirely destroyed by flames, fiberglass and asbestos tapes are most desirable.

Where paper tapes are used, each layer may be 0.005" thick, while rubber laminated with polyester (polyethylene terephthalate) may be 0.015" thick. These are given merely by way of illustration and it will be understood that the thickness of the heat-insulating tapes and the combinations of different materials that may be used will depend upon the amount of heat insulation desired and other cable requirements.

The thickness of the metal tape 14 when aluminum is used depends upon the size of the cable. Experience has shown that a wall thickness of an aluminum sheath of about 0.020 inches or less is satisfactory for 0.250" O.D. cable; and that this thickness should be increased to about 0.40" for a 0.750" O.D. cable. These values are given by way of illustration.

While aluminum is the preferred material for the metal sheath of this invention, other metals can be used such as copper.

FIG. 3 shows a group of cables 40 constructed as in FIGS. 1 and 2. These cables 40 are grouped with other cables 42 which have plastic outer sheaths which are flammable. Experience has shown that an assembly of inside wiring cables installed adjacent to one another and with some of the wiring cables having plastic outer protective jackets which are adjacent to the cables with the metal-protective layer, the metalprotective layer serves as a heat shield for adjacent cables having the plastic outer jacket in the event that the cables are exposed to flames.

The purpose of this invention is to provide a cable of moderate cost that is easy to install and which contributes, when exposed to flames from external sources, a minimum of smoke and fuel to the existing flames, and which does not spread the flames from one area to another.

The preferred embodiment of the invention has been illustrated and described, but changes and modifications can be made and some features can be used in different combinations without departing from the invention as defined in the claims.

What is claimed is:

1. An electrical cable for use as fire-resistant, low voltage communication and signal circuits inside of buildings including in combination a cable core having a multitude of electrical conductors that are individually insulated by a surrounding layer of insulation material, each insulated conductor being crowded together in contact with other insulated conductors of said core, the insulation including inorganic material to reduce flammability of the cable core, said conductors being bunched together in the core with individual conductors located at various and random distances from the outside limits of the core, said core having a heat barrier layer surrounding the bunched conductors and of a thickness substantially less than the radius of the bunch of conductors comprising the core, and an annealed flexible metallic sheath fitting snugly around the core over the heat barrier layer for protecting the core from flames in the vicinity of the cable, said metallic sheath constituting the outermost layer of said cable.

2. The cable described in claim 1 characterized by the metallic sheath being made from metal tape, from the group consisting of aluminum and copper, that is formed longitudinally over the cable core into a tube in which the abutting tape edges are bonded together by welding to form a continuous closed seam, and the heat barrier layer is made of material that does not melt when the outside of the metallic sheath is exposed to flames, the material being from the group consisting of asbestos, paper, and fiberglass.

3. The cable described in claim 2 characterized by the tubular metallic sheath being made with an internal diameter greater than the core diameter during the welding process, and being reduced in diameter and brought into contact with said heat barrier layer after welding, to fit snugly over the cable core.

4. The cable described in claim 3 characterized by the tubular metallic sheath being annealed in tandem after welding and diameter reduction.

5. The cable described in claim 1 characterized by the heat barrier layer being a non-metallic covering that is applied directly over the bunched insulated conductors of the core and under the metallic outer sheath to provide heat and electrical insulating properties and to protect the insulated conductors from mechanical injury, these coverings being selected from the group consisting of asbestos, paper, fiberglass, rubber, solid and foamed plastics and laminations and combinations thereof.

6. The cable described in claim 5 characterized by the non-metallic covering being a tape wrapped longitudinally over the core.

7. The cable described in claim 5 characterized by the non-metallic covering being a tape wrapped helically over the core.

8. The cable described in claim 6 characterized by the non-metallic covering being made of fire-resistant material from the group consisting of asbestos and fiberglass tapes made with a minimum amount of organic binders to provide minimum fuel contribution in case of exposure to fire, and being thinner than the metallic sheath.

9. The cable described in claim 1 characterized by the heat barrier layer being a non-metallic covering applied over the core and constituting superimposed tapes, the different tapes being made of different material.

10. The inside wiring cable described in claim 1 characterized by the insulating material of the core, and the heat barrier layer and metallic sheath providing a structure that has negligible afterburn when subject to standard fire-resistant tests for inside wiring cables.

11. The inside wiring cable described in claim 1 characterized by the overall protecting sheath being made in a tubular form and of material from the group consisting of aluminum and copper and having the metal continuous around the circumference of the cable and being reduced in diameter to fit snugly on the cable core, and the thickness of the metal being from about 0.020" for a 0.25" O.D. cable and up to about 0.040" for a 0.750" O.D. cable.

12. The inside wiring cable described in claim 1 and in which said insulation material is a semi-rigid polyvinyl chloride insulation containing 5 to 40 parts of inorganic filler material including antimony trioxide for resisting combustion of the insulation within the cable core.

13. An assembly of electrical cables for use as fire-resistant, low voltage communication and signal circuits inside of buildings including in combination a plurality of first cables each comprising a cable core having a multitude of electrical conductors that are individually insulated by a surrounding layer of insulation material, the insulation including inorganic material to reduce flammability of the cable core, said conductors being bunched together into a core with individual conductors located at various and random distances from the outside limits of the core, said core having a heat barrier layer surrounding the bunched conductors and of a thickness substantially less than the radius of the bunch of conductors, and an annealed flexible metallic sheath fitting snugly around the core over the heat barrier layer for protecting the core from flames in the vicinity of the cable, said metallic sheath constituting the outermost layer of said cable and a plurality of second structurally independent wiring cables each of similar construction to said first cables but with plastic outer protective jackets substituted for the metallic sheaths of the first cables, the cables with the plastic jackets being adjacent to the cables with the metallic sheaths, so that the metallic sheaths serve as heat shields for adjacent cables having the plastic outer jackets in the event that the assembly is exposed to flames.

14. The assembly described in claim 13 characterized by said metallic sheaths being good conductors of heat, such as aluminum or copper, and the plastic jacket cables being immediately adjacent to one or more of the cables having the metallic sheaths.

* * * * *